United States Patent [19]

Matsuda

[11] Patent Number: 5,293,047
[45] Date of Patent: Mar. 8, 1994

[54] METHOD AND AN APPARATUS FOR DETECTING INDICES OF PAPER BASED ON A REPLACEABLE INTERMEDIATE OR AVERAGE THRESHOLD VALUE

[75] Inventor: Hideaki Matsuda, Miyagi, Japan

[73] Assignee: Tohoku Ricoh Co., Ltd., Shibata, Japan

[21] Appl. No.: 926,419

[22] Filed: Aug. 10, 1992

[30] Foreign Application Priority Data

Aug. 13, 1991 [JP] Japan ............................ 3-202831

[51] Int. Cl.$^5$ ............................................ G01N 21/86
[52] U.S. Cl. ................................... 250/561; 250/548; 250/557
[58] Field of Search ............... 250/557, 560, 561, 571, 250/548, 223 R; 209/528

[56] References Cited

U.S. PATENT DOCUMENTS 5,073,700 12/1991 D'Onofrio ......................... 250/557

FOREIGN PATENT DOCUMENTS 1-44573 9/1989 Japan .

*Primary Examiner*—David C. Nelms
*Assistant Examiner*—S. B. Allen
*Attorney, Agent, or Firm*—Armstrong, Westerman, Hattori, McLeland & Naughton

[57] ABSTRACT

In detecting indices (references) provided on a base paper with a distance therebetween along the longitudinal direction of the base paper, wherein either passed or reflected light amount through or from the indices differs, by a light detector positioned on a feed path while the indices are fed along the longitudinal direction, a threshold value is renewed each time when at least three indices are detected based upon peak values (maximum and minimum values) of output signals from the light detector. This is accomplished by renewing the threshold value by calculating the new threshold value based upon an intermediate or average value among the peak values between, for example, the indices in order to continue the indices position detecting process in an accurate fashion even if there is an abnormality in the base paper or others when the abnormality is minor such that it does not interfere with the subsequent process.

12 Claims, 6 Drawing Sheets

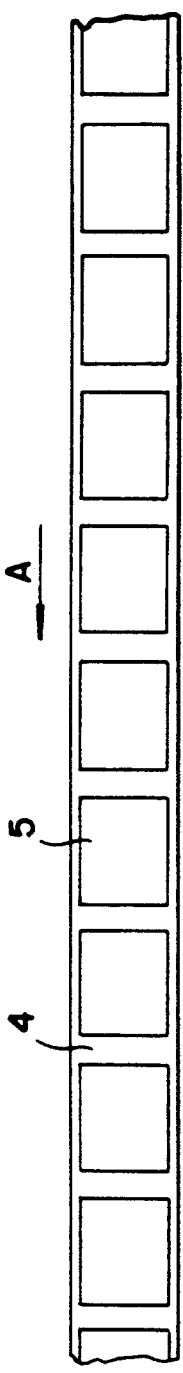
FIG.4(a)
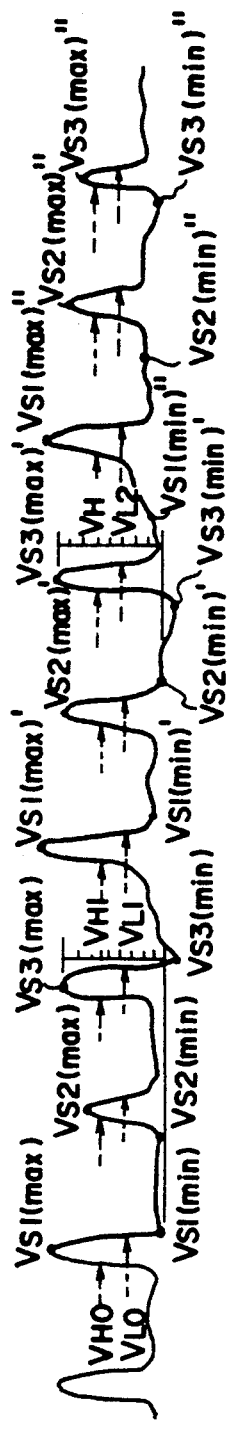
FIG.4(b)
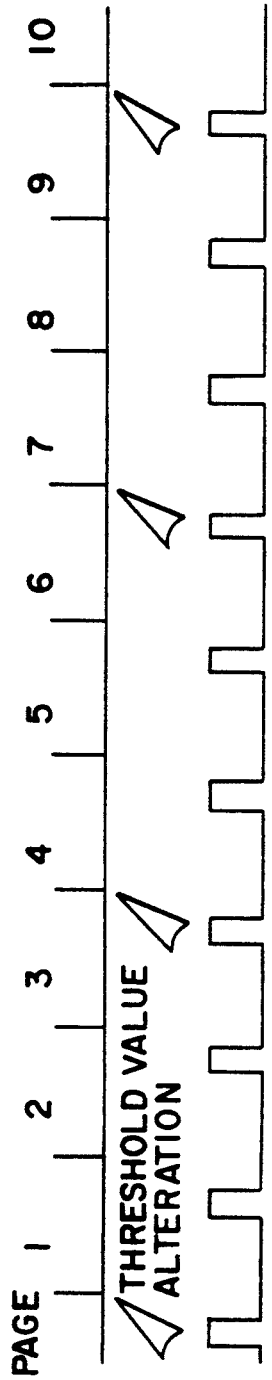
FIG.4(c)
FIG.4(d)

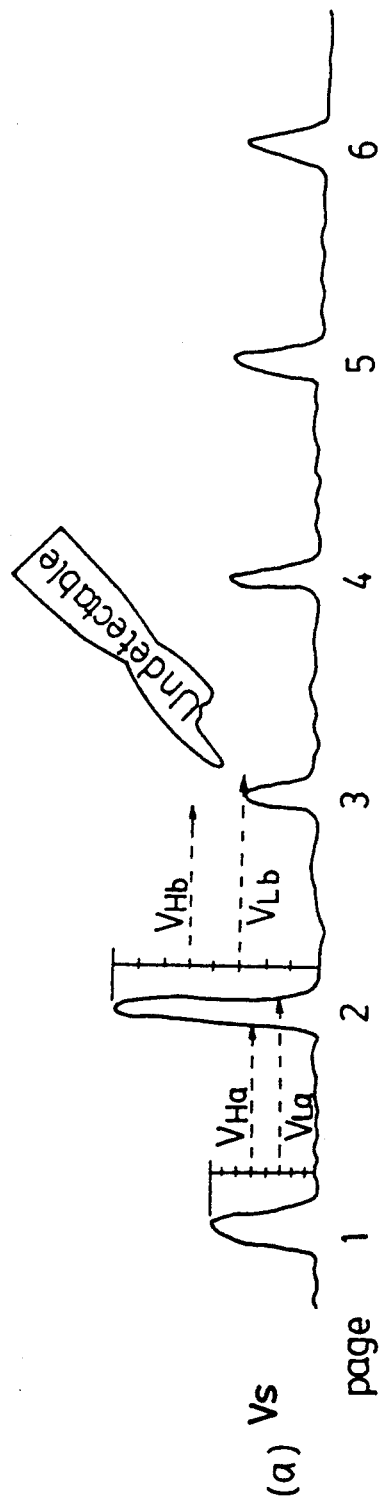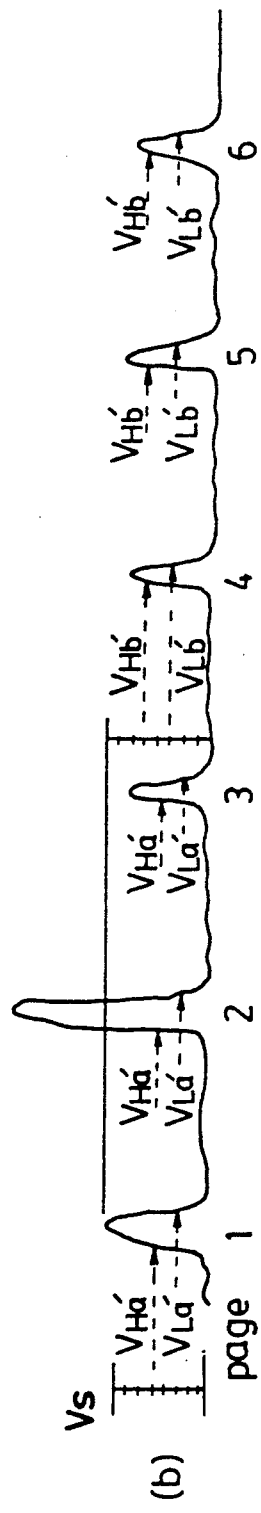

METHOD AND AN APPARATUS FOR DETECTING INDICES OF PAPER BASED ON A REPLACEABLE INTERMEDIATE OR AVERAGE THRESHOLD VALUE

BACKGROUND OF THE INVENTION

1. Field of the Invention

This invention generally relates to a method and an apparatus for detecting the positions of indices which differentiates an amount of transmission light or reflection light and are provided on an elongated base paper along its longitudinal direction with a predetermined distance therebetween (such as, labels or between labels) adhered to an elongated paper or eye marks printed on an elongated paper or notches formed on a tag paper.

2. Description of Prior Art

As to an apparatus of this kind, there is, for example, a label detection apparatus for a label printer as described in Japanese Patent Publication No. 1-44573.

This label detection apparatus detects the positions of the labels by comparing an output from a light detector with a predetermined standard value (a threshold value), wherein the light detector is installed on a feed path or an elongated base paper to which the labels are adhered so as to detect an amount of transmission light through both the portion of the base paper alone and the portion where the labels are adhered.

The apparatus detects and memorizes a peak value of an output from the light detector, and, based upon the memorized value, reestablishes a new standard value for a new label (every time the base paper is moved up for a distance of a pitch of the adhered labels).

Therefore, even if a detection level has changed due to changes of external lights or label paper quality, or by contamination on the light detector, the apparatus ensures the detection of label positions without fail by alternating the level of the standard value in response to those changes.

With the conventional apparatus, however, for each new upcoming label, a new standard value (a threshold value) is set, if an extraordinary detected value is put out in a range of a single-label detection (for example, in a case where the light detector passes over a hole or a perforation between labels), the extraordinary value is memorized as the peak value, and a new standard value is calculated and determined for the next label detection based upon the extraordinary value. Then, it becomes impossible to perform the subsequent label detection and the printer will cease to operate.

However, the above teachings of the conventional apparatus requires an operator even if there is nothing wrong in the printing of the labels.

SUMMARY OF THE INVENTION

The object of this invention is to solve the problems described above, and enables, even if there is a minor problem on the elongated paper such that it does not cause any problem for the subsequent process, to continue accurate detection of the positions of the indices on the elongated paper which indices differentiate an amount of transmission light or reflection light on or through the labels or therebetween.

According to the method of detecting the indices on the elongated paper of this invention, in detecting the positions of the indices which differentiates an amount of transmission light or reflection light and are provided on the elongated paper with a distance therebetween, the above-mentioned threshold value is redetermined based upon the peak value among the outputs by the light detector during a period in which the indices of at least three or more are detected during feeding of the paper.

Also, in order to perform this method more favorably, the indices detection apparatus has the light detector provided in the feed path of the above-mentioned elongated paper for detecting the indices provided on the elongated paper with a distance while differentiating an amount of transmission or reflection light and further has a comparative detection means for detecting the positions of the above-described indices by comparing the outputs from the light detector with the threshold value, wherein the indices detecting apparatus is further provided with the following means, labelled (a) through (e):

(a) a peak value detection means for detecting the maximum and minimum values among the outputs from the light detector in a predetermined feed distance of the paper necessary for detecting one index described above;

(b) a maximum-and-minimum value memorization means for memorizing the maximum and minimum values detected by the peak value detection means;

(c) a proper-peak-value determination means for determining proper maximum and minimum values based upon the maximum and the minimum values stored in the maximum and minimum value memorization means after detecting at least three indices;

(d) a threshold-value operation means for operating a new threshold value based upon the maximum and the minimum values determined by the proper-peak-value determination means; and (e) a threshold-value re-determination means for determining the new threshold value operated by the threshold value operation means as a new threshold value.

Therefore, according to the method of detecting the indices on the elongated paper of this invention, every time at least three indices are detected, it is possible to re-determine the threshold value based upon, for example, an intermediate value or an averaged value out of those detected indices. Thus, there will be no occurrence of a case whereby the later index detection becomes impossible when the threshold value has been dramatically changed because of a single detection of the peak value due to an abnormality of the elongated paper or of the indices, and it is possible to detect the positions of the indices in a stable fashion.

According to the indices detection apparatus of this invention, the threshold value is further determined based upon the maximum and the minimum values of the detected signals by the light detector.

Accordingly, it is always possible to accurately detect the positions of the indices regardless of the kinds of papers or indices in use since the determination of the proper threshold value is always performed no matter how large or small the difference of the level is among the detected signals between the portion of paper where an index exists and the other position where no index exists.

The above and other objects, features and advantages of the invention will be apparent from the following detailed description which is to be read in conjunction with the accompanying drawings.

BRIEF DESCRIPTION OF THE DRAWINGS

FIG. 5 illustrates an explanatory drawing to show an example of the detected signals by the light detector and the threshold value renewal by a conventional label detection apparatus;

FIG. 6 illustrates an explanatory drawing to show an example of the detected signals by the light detector and the threshold value renewal according to the embodiment of this invention;

DETAILED DESCRIPTION OF THE PREFERRED EMBODIMENTS

The embodiment of this invention is hereinafter explained with reference to the drawings.

Figure 1:
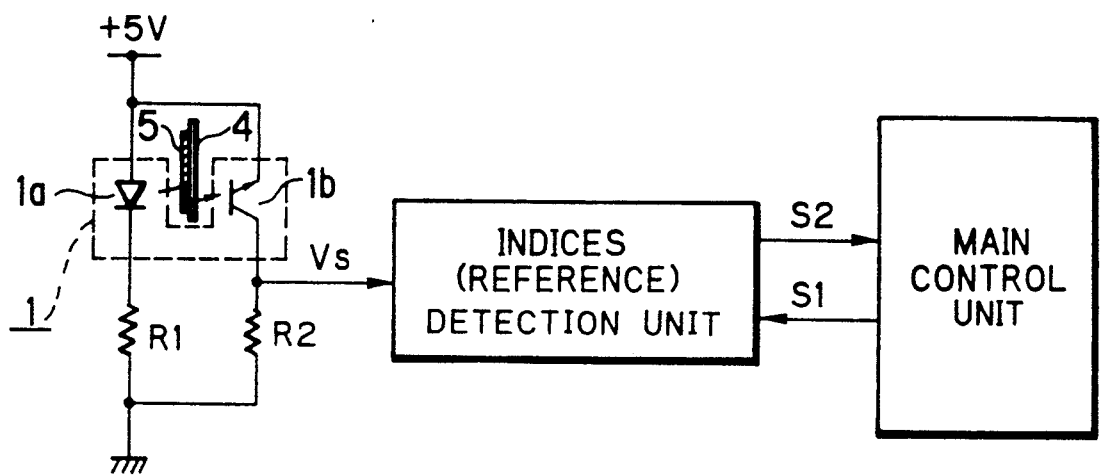
FIG. 1 illustrates a block circuit of an indices detection apparatus of an embodiment of the invention.

FIG. 1 is a block circuit of the indices detection apparatus for performing the method for detecting the indices on the base paper according to this invention. The apparatus has light detector 1, a power source circuit, indices detection unit 2, and a main control unit 3. The drawings of a mechanical unit (such as, a base paper feed unit and others) are not shown since they are the same as the conventional apparatuses.

Light detector 1 uses, in this embodiment, a transmittal-type photo sensor in which light emitting diode (LED) 1a and photo transistor 1b of a light receiving member are installed facing each other with a slit in between.

Figure 2:
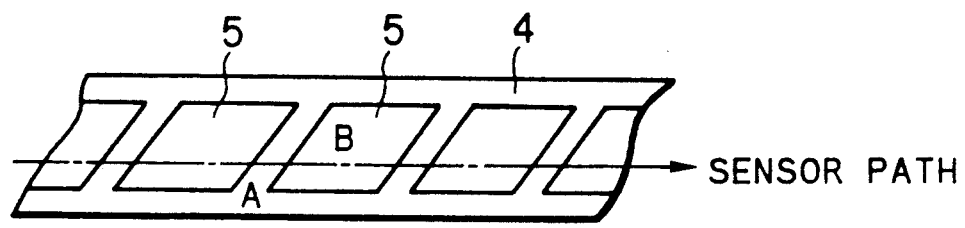
FIG. 2 illustrates a diagonal view to show a base paper adhered with labels to be detected according to this embodiment, and a sensor path for a light detector.

Light detector 1 is set in a feed path of an elongated paper 4 on which labels 5 are adhered with a distance therebetween along its longitudinal direction, as shown in FIG. 2. It is arranged such that the sensing path, shown by a dotted line in FIG. 2, runs between LED 1a and photo transistor 1b of the light detector 1.

Light detector 1 respectively converts an amount of transmission light which passes through a portion A of the base paper 4 alone between adjacent labels 5, 5 (in this embodiment, this portion is called an index or a reference), and a portion B where a label 5 is adhered to, into an electric signal respectively as an output.

LED 1a of light detector 1 radiates upon receipt of an input of +5 V from a power source, and protective resistance R1 is interposed in a path to the ground. In photo transistor 1b, an electric current runs corresponding to the received light amount, and is converted into voltage signal Vs by resistance R2 and inputted to indices detection unit 2.

Indices detection unit 2 constantly receives voltage signal Vs (hereinafter referred to as "detected signal") of an analog output signal from the light detector 1, and from main control unit 3, signal S1 is transmitted and inputted to indices detection unit 2 each time that the base paper 4 is fed for a predetermined distance (this is equivalent to the distance of a pitch of adhered labels 5 and is hereinafter referred to as "one page length") necessary to detect one index of base paper 4 (between labels 5 and 5).

Figure 3:
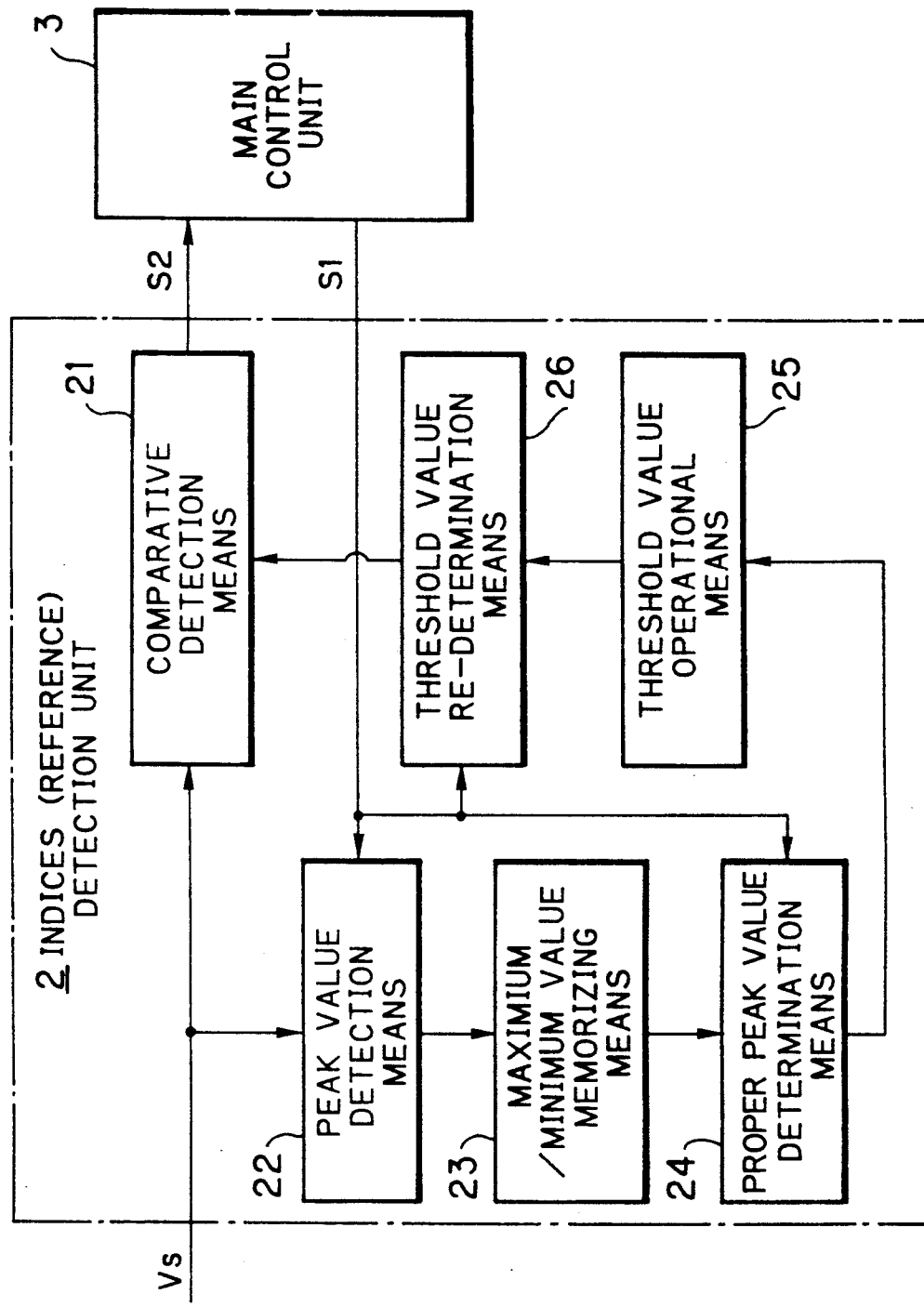
FIG. 3 illustrates a block diagram to show a functional structure of an indices detection unit shown in FIG. 1.

As shown in FIG. 3, indices detection unit 2 is provided with comparative detection means 21, peak detection means 22, maximum-and-minimum value memorization means 23, proper-peak-value determination means 24, threshold value operation means 25, and threshold value redetermination means 26.

Then, detected signal Vs is compared with a predetermined threshold value by comparative detection means 21, and binary indices detection signal S2 is outputted and transmitted to main control unit 3 when detected signal Vs exceeds the threshold value.

In addition, among detected signals Vs input, during a period from an input of signal S1 out of main control unit 3 to that of subsequent signal S1, the maximum and minimum values Vs(max) and Vs(min) are detected by peak-value detection means 22 and memorized by maximum-and-minimum-value memorization means 23.

Proper-peak-value determination means 24 determines the proper maximum and minimum values based upon the respective maximum and minimum values of the detected signal Vs memorized in maximum-and-minimum-value memorization means 23 each time that at least three indices are detected while base paper 4 is fed as shown in FIG. 2. That is, when base paper 4 is fed for a distance of at least a three-page length (for each time, at least three signals S1 are inputted).

Based upon the determined proper maximum and minimum values, threshold value operation means 25 operates a new threshold value, and threshold value redetermination means 26 redetermines the operated threshold value as a new threshold value for comparative detection means 21.

These functional means 21-26 can be made by a wired logic circuit. However, it is also easily accomplished by using a microcomputer comprised of CPU, RAM or ROM, and others. In this case, detected signals Vs must be converted through A/D conversion and digitalized.

Several examples of the method for determining the proper maximum and minimum values by proper-peak-value means 24 are described hereinafter.

(A) In every three page feeding, the proper maximum Vs(max) and minimum (Vs(min) values are the intermediate values among the maximum values, Vs1(max), Vs2(max) and Vs3(max); and the minimum values, Vs1(min), Vs2(min), and Vs3(min), respectively, of detected signal Vs memorized in maximum-and-minimum-value memorization means 23. For example, if relationships of these values are as follows:

Vs1(max) > Vs3(max) > Vs2(max)
Vs3(min) > Vs1(min) > Vs2(min),

Vs3(max) and Vs1(min) are determined as the maximum and minimum values, respectively.

(B) In a similar manner as described above, in feeding odd number of pages, at least three pages, for example, in a case of feeding five pages, the proper maximum value Vs(max) is the third largest one among the maximum values and the proper minimum value Vs(min) is the third smallest one among the minimum values, and in a case of feeding seven pages, the former is the fourth largest and the latter is the fourth smallest values, respectively.

(C) In a multiple page feeding of at least three pages, and from the maximum values, Vs1(max),... ..., Vsn(max), and the minimum values, Vs1(min),... ..., Vsn(min) of the memorized detected signal Vs, the averaged maximum value is: {Vs1(max)+... ... +Vsn(max)}/n; and the averaged minimum value is: {Vs1(min)+... ...+Vsn(min)}/n. These are determined as the proper maximum and minimum values.

(D) In a multiple page feeding of at least three pages, from the maximum values, Vs1(max),... ..., Vsn(max), and the minimum values, Vs1(min),... ...,Vsn(min) among detected signals Vs memorized during each page feeding, the proper maximum Vs(max) and minimum Vs(min) values are determined by averaging the respective values while excluding those exceeding a predetermined level respectively.

Based upon the determined maximum and minimum values by one of the above described methods, threshold value operation means 25 operates a new threshold value, for example, by the following formulas:

$$VH = \tfrac{2}{3}\{Vs(max) - Vs(min)\} + Vs(min); \text{ and}$$

$$VL = \tfrac{1}{3}\{Vs(max) - Vs(min)\} + Vs(min),$$

wherein VH is a threshold value for a period of rising in detected signal Vs, and VL is a threshold value for a period of falling thereof.

In these formulas, the numbers are not limited to "$\tfrac{2}{3}$" and "$\tfrac{1}{3}$". It is aimed to provide a superior performance against noises by setting a hysteresis for threshold value VH used when detected signal Vs is rising and a threshold value VL used when the signal is falling. If stable detected signal Vs can be obtained, the new threshold value for both the periods of rising and falling in detected signal Vs can be the intermediate value among the maximum and minimum values calculated by the following formula:

$$VH = VL = \{Vs(max) + Vs(min)\}/2.$$

Thus, using the new threshold value operated in a multiple page feeding of at least three pages, threshold-value redetermination means 26 redetermines and renews a threshold value for comparative detection means 21.

That is, based upon the new threshold value operated in a multiple page feeding of at least three pages, detected signal Vs of light detector 1 is digitalized (into binary code) in a next multiple page feeding of at least three pages, and based upon the new threshold value operated in the next multiple page feeding of at least three pages, detected signal Vs is digitalized further in a subsequent multiple page feeding of at least three pages. This process is repeated further.

Figure 4:
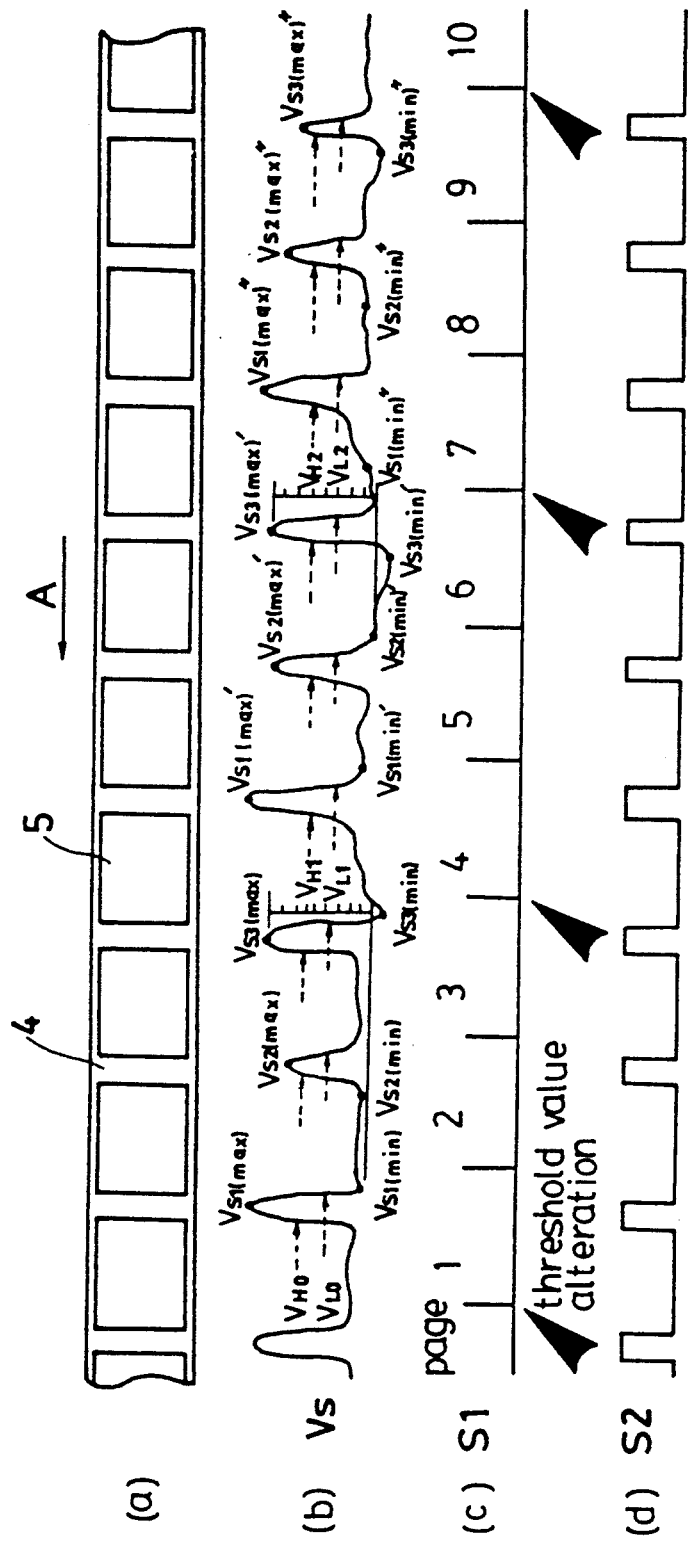
FIGS. 4A-4D illustrate an explanatory drawing to show relationship between the label-adhered base paper and each signal to explain the function of an index position detection and threshold value renewal according to the embodiment.

The renewal of the threshold value is easily done in indices detection unit 2 by supervising signals S1 for predetermined pages (multiple pages of at least three), shown by (c) in FIG. 4, sent from main control unit 3, in every page feeding of base paper 4, shown by (a) in FIG. 4, along the direction of an arrow A.

In this manner, detected signal Vs, shown by (b)in FIG. 4, from light detector 1 is digitalized into a binary code by each threshold value VH and VL, and indices detection signal S2, shown by (d) in FIG. 4, is sent from indices detection unit 2 to main control unit 3.

Accordingly, main control unit 3 can detect the front end position of a label 5 along the feed direction at every page by the falling in signal S2.

The renewal of the threshold value in every three-page feeding as discussed in the previous example (A) is now explained in more detail with reference to FIG. 4.

Suppose that the threshold values of rising and falling periods are VHO and VLO, as shown in the left end of FIG. 4(b), then as to pages 1, 2 and 3, detected signals Vs are digitalized based upon threshold values VHO and VLO and indices detection signal S2 is generated, as shown in (d) of the figure.

Among detected signals Vs memorized in each page feeding of page 1, 2 and 3, and where the maximum values are Vs1(max), Vs2(max) and Vs3(max), and the minimum values are Vs1(min), Vs2(min) and Vs3(min), the relationship of the maximum values is:

Vs1(max) > Vs3(max) > Vs2(max), and the relationship of the minimum values is:

Vs3(min) < Vs1(min) < Vs2(min).

Therefore, if the intermediate values of the maximum and minimum values are employed as the proper maximum and minimum values, they are Vs3(max) and Vs1(min), respectively.

So, new threshold values VH1 and VL1 for the next feeding of page 4, 5 and 6 are obtained by the following formulas:

$$VH1 = \tfrac{2}{3}\{Vs3(max) - Vs1(min)\} + Vs1(min); \text{ and}$$

$$VL1 = \tfrac{1}{3}\{Vs3(max) - Vs1(min)\} + Vs1(min).$$

After the previous renewal of the threshold values, when the signals S1 are counted three times, the threshold values are renewed to those values, and as to pages 4, 5 and 6, detected signal Vs is digitalized by these new threshold values, and indices detection signal S2 is generated.

In a similar manner, during the feeding of pages 4, 5 and 6, the maximum values Vs1(max)', Vs2(max)' and Vs3(max)', and minimum values Vs1(min)', Vs2(min)' and Vs3(min)' among memorized detected signal Vs, the relationship of the maximum values is:

Vs1(max)' > Vs3(max)' > Vs2(max)';

and the relationship of the minimum values is:

Vs3(min)' < Vs2(min)' < Vs1(min)'.

Thus, the proper maximum and minimum values are Vs3(max)' and Vs2(min)', respectively, if the intermediate values of the maximum and minimum values are employed.

Therefore, new threshold values VH2 and VL2 for the next page feeding of pages 7, 8 and 9 are obtained by the following formulas:

$$VH2 = \tfrac{2}{3}\{Vs3(max)' - Vs2(min)'\} + Vs2(min)'; \text{ and}$$

$$VL2 = \tfrac{1}{3}\{Vs3(max)' - Vs2(min)'\} + Vs2(min)'.$$

After the previous renewal of the threshold values, when signals S1 are again counted three times, the threshold values are renewed by the new values, and in the page feeding of pages 7, 8, and 9, detected signal Vs is digitalized based upon the threshold values VH2 and VL2, and indices detection signal S2 is generated.

Afterward, the threshold values VH and VL are renewed in every three-page feeding in the same manner.

FIG. 5 shows the relationship between detected signal Vs and the threshold values in every one page feeding as required in the conventional method, with the minimum values are identical for every page for the sake of convenience.

In the page whereon an extraordinary value (for example, in a case that there happens to be a hole in base paper 4 on the sensor path) is detected (shown in page 2 in this example), since the next threshold values are determined based upon the extraordinary value, the threshold values are renewed like VHa→VHb and VLa→VLb.

Due to this, there is a problem in that the normal detected signal Vs for the next page cannot be detected based upon the new threshold values VHb and VLb. Therefore, in a case of a printing apparatus or other which prints on the labels by detecting the label position on the base paper based upon the indices detection signals, the printing apparatus recognizes it as a label jam error and ceases to print.

On the contrary, in the above described embodiment of this invention, since the threshold values are renewed in every three-page feeding, it is accomplished as shown in FIG. 6.

If the threshold values are VHa' and VLa', detected signals Vs described with respect to pages 1-3 are digitalized by those threshold values and, in pages 4-6, the threshold values are renewed based upon the maximum and minimum values of detected signals Vs in pages 1-3.

Accordingly if, for the sake of convenience, the minimum values are all identical in all of the pages, the magnitude of the maximum values of detected signals Vs in each of pages 1-3 is as follows:

page 2>page 1>page 3.

Therefore, the threshold value is determined based upon the intermediate maximum value of page 1, and will not be renewed based upon the abnormal value of page 2. Thus, detected signals Vs detected in subsequent pages 4-6 are digitalized by new threshold values VHb' and VLb' determined by the maximum and minimum values of page 1, and there is then no case where the detection becomes impossible as shown in FIG. 5.

Thus, according to the present invention, the problem is prevented wherein due to a slight abnormality in the base paper or in the label itself so minor that it should not cause any problem for the subsequent label processing, the subsequent label detection nevertheless becomes impossible so as to stop a printing apparatus like a printer and others, and to cause the operator's involvement, and attains an advantage such that the positions of the indices (reference) is detected in a stable fashion. This is due to the fact that the abnormal or extraordinary value as described above, is excluded since the threshold value is renewed based upon the intermediate or averaged value among the peak values of the detected signals in each of the three pages.

Further, in detecting the label positions in the label printer by an amount of light passed through or reflected from the elongated base paper where labels 5 are adhered to, as shown in FIGS. 2 and 4, the number of differences in the amount of light passed through or reflected from the portions of "base paper 4 alone" or those of "base paper 4 plus label 5" exists as many as the kinds of base paper 4 and label 5.

In detecting an amount of reflected light, a photo sensor of a reflecting type is used as the light detector by setting, for example, a base paper 4 to a dark color and a label 5 to a light color. This means that an amount of either the passed light through or reflected light from either base paper 4 or label 5 differ in an infinite variety and so is an amount of either the passed light through or reflected light from the combination of base paper 4 and label 5 adhered thereto.

In order to detect, without fail, the level difference of infinite variety according to the above-described embodiment, the threshold (standard) value is determined based upon the maximum and minimum values of detected signal Vs. By this method, it becomes possible to set an optimum threshold value for any kind of label paper; such as, either the one with a small level difference or the other with a large level difference. That is, an optimum threshold value is relatively determined with respect to the respective change of the maximum and minimum values of the detected signals.

Further, by setting the threshold values with respect to rising and falling in the detected signals at the levels of ⅔ of the maximum value and ⅔ of the minimum values, respectively, there is an advantage in that the apparatus can work well regardless of the change in the level of the detected signals caused by the floating of the base paper or the like, or of the foreign noise caused to the detected signals.

Figure 7:
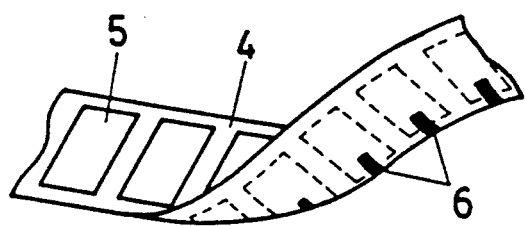
FIG. 7 illustrates a diagonal view of the base paper to show a second example of the indices to be detected by this invention.
Figure 8:
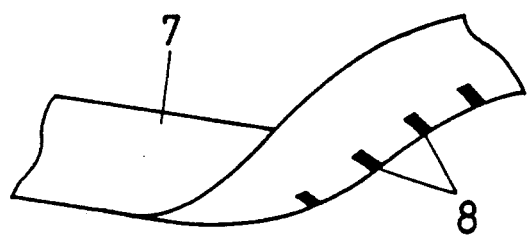
FIG. 8 illustrates a diagonal view of a heat sensitive paper to show a third example of the indices to be detected by this invention.
Figure 9:
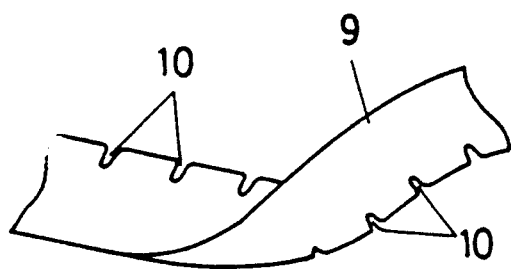
FIG. 9 illustrates a diagonal view of the base paper to show a fourth example of the indices to be detected by this invention.

Although the above embodiment is explained where elongated base paper 4 is provided with labels 5 adhered thereto with a distance therebetween along its longitudinal direction; and intermediate portions alone between adjacent labels 5 of base paper 4 are used as the indices (references), the indices can be the labels themselves. In a case where the photo sensor of reflected-type is used, by printing eye marks 6 for showing the adhering positions of labels 5 at the underside of base paper 4, as shown in FIG. 7, or by printing eye marks 8 with a distance therebetween on heat sensitive paper 7 along its longitudinal direction, as shown in FIG. 8, these eye marks 6 or 8 can be used as the indices.

Further, in detecting elongated paper (tagged paper) 9 where notches 10 are provided at its longitudinal side, these notches 10 are used as the indices.

The present invention is also effective where a number of different indices are used.

Having described the illustrative embodiment of the invention with reference to the accompanying drawings, it is to be understood that the invention is not limited to such a precise embodiment, and that various changes and modifications may be effected therein by one skilled in the art without departing from the scope and spirit of the invention as defined in the appended claims.

What is claimed is:

1. A method for detecting indices provided on an elongated paper with a distance therebetween along the longitudinal direction thereof, wherein a light is applied to produce a resulting light for sequential detection of the positions of said indices, the method comprising the steps of:

detecting said resulting light by a light detector positioned along a feed path of said paper along the longitudinal direction thereof;

sequentially detecting the positions of said indices by comparing outputs from said light detector with a threshold value; and replacing said threshold value with a new threshold value after every at least three indices are detected, each new threshold value based upon a peak memorized value of the outputs from said light detector during the period that each said at least three preceding indices are detected.

2. A method according to claim 1, wherein said resulting light is a light passed through said indices.

3. A method according to claim 1, wherein said resulting light is a light reflected from said indices.

4. A method according to claim 1, wherein said threshold value is replaced each time when an odd number of at least three pieces of said indices are detected by calculating a new threshold value based upon an intermediate value among the peak values of outputs from said light detector, each detected between said indices.

5. A method according to claim 1, wherein said threshold value is replaced each time when at least three pieces of said indices are detected by calculating a new threshold value based upon an averaged value of peak values of outputs from said light detector, each detected between said indices.

6. A method according to claim 1, wherein said threshold value is replaced each time when at least three pieces of said indices are detected by calculating a new threshold value based upon an averaged value among peak values of outputs from said light detector, each detected between said indices while excluding a peak value exceeding a predetermined level value.

7. A method according to claim 1, wherein a hysteresis is set having a first threshold value to be used in a rising in the output of said light detector, and a second threshold value to be used in a falling in the output thereof.

8. An indices detecting apparatus for a paper having a light detector for detecting the indices provided at the feed path of the elongated paper with a distance therebetween along the longitudinal direction thereof, wherein a resulting light from the indices differs, and an indices detecting means for detecting the positions of the indices by comparing outputs from the light detector with a threshold value, said indices detecting device comprising:

a peak-value detecting means for detecting maximum and minimum values of the outputs from said light detector within a predetermined feed distance along the longitudinal direction of said paper necessary for detecting a piece of said indices;

a maximum-and-minimum values memorizing means for memorizing the maximum and minimum values detected by said peak-value detecting means;

a proper-peak-value determining means for determining proper maximum and minimum values based upon each of maximum and minimum values memorized by said maximum-and-minimum-values memorizing means when said indices of at least three are detected;

a threshold-value operation means for operating a new threshold value based upon said maximum-and-minimum values determined by said proper-peak-value determination means; and a threshold-value re-determination means for re-determining said new threshold value operated by said threshold-value operation means.

9. An indices detecting apparatus for a paper according to claim 8, wherein said proper-peak-value determination means is a means for determining a first intermediate value among said maximum values and a second intermediate value among said minimum values each memorized in said maximum and minimum value memorizing means as proper maximum and minimum values, respectively.

10. An indices detecting apparatus for a paper according to claim 8, wherein said proper-peak-value determination means is a means for determining a first average value among maximum values and a second average value among minimum values memorized in said maximum-and-minimum-value memorizing means as proper maximum and minimum values, respectively.

11. An indices detecting apparatus for a paper according to claim 8, wherein said proper-peak-value determination means is a means for determining a first average value among said maximum values and a second average value among said minimum values memorized in said maximum-and-minimum-value memorizing means, each excluding a value exceeding a predetermined value as proper maximum and minimum values, respectively.

12. An indices detecting apparatus for a paper according to claim 8, wherein said threshold-value operation means is a means for operating a new threshold value by setting a hysteresis having a first threshold value to be used for the rising in the output of said light detector and a second threshold value for the falling in the output thereof based upon the maximum-and-minimum-values determined by said proper-peak-value determination means.

* * * * *